(12) United States Patent
Oberle

(10) Patent No.: US 10,127,147 B2
(45) Date of Patent: Nov. 13, 2018

(54) AUTOMATED SOFTWARE COMPLIANCE ANALYSIS

(71) Applicant: SAP SE, Walldorf (DE)

(72) Inventor: Daniel Oberle, Durmersheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/389,761

(22) Filed: Dec. 23, 2016

(65) Prior Publication Data

US 2018/0181483 A1 Jun. 28, 2018

(51) Int. Cl.
*G06F 9/44* (2018.01)
*G06F 11/36* (2006.01)

(52) U.S. Cl.
CPC ...... *G06F 11/3688* (2013.01); *G06F 11/3692* (2013.01)

(58) Field of Classification Search
CPC .................................................. G06F 11/3688
USPC .................................................. 717/123–129
See application file for complete search history.

(56) References Cited

U.S. PATENT DOCUMENTS

| | | | | |
|---|---|---|---|---|
| 6,071,316 A * | 6/2000 | Goossen | ............. | G06F 11/3612 714/E11.209 |
| 7,069,546 B2 * | 6/2006 | Tsarfati | ..................... | G06F 8/20 717/149 |
| 7,376,937 B1 * | 5/2008 | Srivastava | ............... | G06F 8/427 717/126 |
| 8,055,737 B2 * | 11/2011 | Ciano | ..................... | G06F 9/455 709/220 |
| 8,078,568 B2 | 12/2011 | Stuhec et al. | | |
| 8,196,104 B2 * | 6/2012 | Cohrs | ................. | G06F 11/3672 717/124 |
| 8,286,143 B2 * | 10/2012 | Garimella | ........... | G06F 11/3688 717/124 |
| 8,307,351 B2 * | 11/2012 | Weigert | .................. | G06F 21/16 717/131 |
| 8,468,502 B2 * | 6/2013 | Lui | ..................... | G06F 11/3636 717/125 |
| 8,479,161 B2 * | 7/2013 | Weigert | ............. | G06F 11/3604 717/124 |
| 8,539,447 B2 * | 9/2013 | Kilian | ................. | G06F 11/3604 717/124 |
| 8,572,566 B2 * | 10/2013 | Gass | ........................ | G06F 8/71 717/101 |
| 8,621,441 B2 * | 12/2013 | Landwehr | ........... | G06F 11/3604 714/38.1 |

(Continued)

OTHER PUBLICATIONS

Galan et al, "Towards Adaptive Compliance", IEEE, pp. 108-114, 2016.*

(Continued)

*Primary Examiner* — Anil Khatri
(74) *Attorney, Agent, or Firm* — Klarquist Sparkman, LLP

(57) ABSTRACT

Techniques and solutions are described for facilitating the determination of whether a software program may raise a compliance issue, such as whether processes invoked by the software program may involve the sending of protected information. A compliance tool automatically determines a plurality of processes invoked by a program. A plurality of the invoked processes are compared with a process compliance library comprising at least one process. The comparing produces compliance results. The compliance results are output to a user.

19 Claims, 11 Drawing Sheets

(56) References Cited

U.S. PATENT DOCUMENTS

| | | | |
|---|---|---|---|
| 8,646,093 B2* | 2/2014 | Myers | G06F 21/105 |
| | | | 705/59 |
| 8,768,923 B2 | 7/2014 | Drumm et al. | |
| 8,813,039 B2* | 8/2014 | Maczuba | G06F 11/0778 |
| | | | 714/25 |
| 9,009,677 B2* | 4/2015 | Zhao | G06F 11/3688 |
| | | | 717/127 |
| 9,158,522 B2 | 10/2015 | Nyisztor et al. | |
| 9,171,060 B2 | 10/2015 | Oberle et al. | |
| 9,258,668 B2 | 2/2016 | Mall et al. | |
| 9,344,833 B2 | 5/2016 | Nyisztor et al. | |
| 9,778,930 B2* | 10/2017 | Dimitrakos | G06F 8/71 |
| 9,794,297 B1* | 10/2017 | Hamilton, II | H04L 63/20 |
| 9,841,981 B2* | 12/2017 | Dimitrakos | G06F 9/44505 |
| 2007/0288250 A1 | 12/2007 | Lemcke et al. | |
| 2008/0319937 A1 | 12/2008 | Stuhec et al. | |
| 2010/0031240 A1 | 2/2010 | Drumm et al. | |
| 2011/0078215 A1 | 3/2011 | Oberle et al. | |
| 2014/0280370 A1 | 9/2014 | Oberle et al. | |
| 2016/0034538 A1 | 2/2016 | Oberle | |

OTHER PUBLICATIONS

Burg et al, "Tracing Software Build Processes to Uncover License Compliance Inconsistencies ", ACM, pp. 731-741, 2014.*

Hnat et al, "A Modular and Extensible Macroprogramming Compiler", ACM, pp. 49-54, 2010.*

Budde et al, "Compiling APL to Accelerate through a Typed Array Intermediate Language ", ACM, pp. 13-18, 2015.*

Talbot et al, "Just-in-time Length Specialization of Dynamic Vector Code", ACM, pp. 20-25, 2014.*

Cui et al, "Extendable Pattern-Oriented Optimization Directives", ACM Transactions on Architecture and Code Optimization, vol. 9, No. 3, Article 14, pp. 1-37, 2012.*

Oberle, et al., "An Ontology for Software," 20 pages, 2009. [https://userpages.unikoblenz.de/~staab/Research/Publications/2009/handbookEdition2/ontology-for-software], visited on or before Oct. 24, 2016.

Oberle, et al., "Engineering Compliant Software: Advising Developers by Automatic Legal Reasoning," *SCRIPTed*, vol. 9, No. 3, 34 pages, 2012.

Oberle, "Ontologies and Reasoning in Enterprise Service Ecosystems," *Informatik Spektrum*, vol. 37, No. 4, 13 pages, 2014.

Oberle, et al., "Towards Ontologies for Formalizing Modularization and Communication in Large Software Systems," 48 pages, Sep. 23, 2005. [http://lambda.csail.mit.edu/~chet/papers/others/o/oberle/joao2005], visited on or before Oct. 24, 2016.

Raabe, et al., "Recht ex Machina: Formalisierung des Rechts im Internet der Dienste," 476 pages, 2012.

"Eclipse Java development tools (JDT) Overview," retrieved from http://www.eclipse.org/jdt/overview.php, on or before Dec. 2016, 3 pages.

"SWT: The Standard Widget Toolkit," retrieved from https://www.eclipse.org/swt/, on or before Dec. 2016, 2 pages.

"JFace," retrieved from https://wiki.eclipse.org/JFace, on or before Dec. 2016, 12 pages.

Kumar, Pradeep, "The nerdy credentials," retrieved from http://www.slideshare.net/prady00/webservices-overview-xml-rpc-soap-and-rest, on or before Dec. 20, 2016, 37 pages.

"Team. Platform Team Repository Integration Framework. Compare Framework," retrieved from https://www.eclipse.org/eclipse/platform-team/, on or before Dec. 2016, 2 pages.

"Eclipse Workspaces: What for and why?" retrieved from http://stackoverflow.com/questions/13552266/eclipse-workspaces-what-for-and-why, on or before Dec. 2016, 4 pages.

"Eclipse (software)," retrieved https://en.wikipedia.org/wiki/Eclipse_(software), on or before Dec. 2016, 10 pages.

"Develop Applications on Integrated SUSE and SAP Platforms," retrieved from http://www.slideshare.net/SAPAppsPartner/suse-technical-webinar-build-hana-apps on or before Dec. 20, 2016, 200 pages.

"SAP HANA Studio Part 1," retrieved from http://saphanatutorial.com/sap-hana-studio/, on or before Dec. 2016, 18 pages.

"DOLCE: a Descriptive Ontology for Linguistic and Cognitive Engineering," retrieved from http://www.loa.istc.cnr.it/old/DOLCE.html on or before Dec. 2016, 2 pages.

"Core Software Ontology Core Ontology of Software Components Core Ontology of Services," retrieved from http://km.aifb.kit.edu/sites/cos/ on or before Dec. 2016, 5 pages.

"SmarterPrivacy," machine translation of page retrieved from http://www.smarterprivacy.de/ on or before Dec. 2016, 1 page.

"Sending and Parsing Response using HTTP Client for a JSON List," retrieved from http://stackoverflow.com/questions/20374156/sending-and-parsing-response-usinghttp-client-for-a-json-list, on or before Dec. 2016, 2 pages.

Mkyong, "RESTful Java client with Apache HttpClient," retrieved from https://www.mkyong.com/webservices/jax-rs/restful-java-client-with-apachehttpclient/, 2011, 14 pages.

"SOAP web service tutorial," retrieved from http://www.java2blog.com/2013/03/soap-web-service-tutorial.html, on or before Dec. 2016, 6 pages.

"Java: Find all callers of a method—get all methods that call a particular method," retrieved from http://www.programcreek.com/2011/07/find-all-callers-of-a-method/, on or before Dec. 2016, 5 pages.

"Obtaining call hierarchy in Eclipse CDT," retrieved from http://stackoverflow.com/questions/11559540/obtaining-call-hierarchy-in-eclipsecdt, on or before Dec. 2016, 2 pages.

* cited by examiner

AUTOMATED SOFTWARE COMPLIANCE ANALYSIS

FIELD

The present disclosure generally relates to analyzing software programs for compliance issues. Particular implementations relate to analyzing processes invoked by a software program to determine if they raise a compliance issue associated with a formalized compliance norm.

BACKGROUND

Society is becoming ever more data driven. Companies are able to track their operations at increasing levels of granularity. For individuals, as more and more of their activity takes place, or is tracked, in the digital world, their personal information is often recorded, used, shared, and sold. Even discounting nefarious activities such as hacking, phishing, malware, and viruses, a tremendous amount of information regarding individuals can be gathered through sources such as the websites an individual visits, their actions on the websites, and activity on social networks. Information stored by companies, such as banks, medical providers, and employers, can also be sensitive.

Individuals and governments are increasingly sensitive to the collection and use of personal information. Various laws have been passed to try and specify what information about an individual can be collected, how it can be collected, and how it can be used, shared, or sold. While such laws can be beneficial for individuals, it can be difficult for companies, and particularly the individuals working at companies, to be aware of all the various laws and regulations that might apply to their activities. Even if a company or employee is aware of a law or regulation, laws and regulations can be difficult to understand, and their ramifications may not be clear without additional context. Thus, even companies and employees wishing to comply with relevant laws and regulations regarding the use of personal information may find it difficult to determine whether their actions, or proposed actions, will be legally compliant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the determination of whether a software program may raise a compliance issue, such as whether processes invoked by the software program may involve the sending of protected or restricted information. According to a particular method, a compliance tool automatically determines a plurality of processes invoked by a program. A plurality of the invoked processes are compared with a process compliance library comprising at least one process. The comparing produces compliance results. The compliance results are output to a user.

According to another method, a call hierarchy is determined for a program. The call hierarchy includes a plurality of processes invoked by the program. Program information associated with at least one of the plurality of invoked processes is determined. At least a portion of the program information is associated with at least one formalized compliance term. At least one of the invoked processes is analyzed using at least one formalized compliance norm that includes the at least one formalized compliance term. A visual representation of the formalized compliance norm is output for display. In a particular aspect, the visual representation can indicate that the at least one formalized compliance term may be associated with a potential compliance issue.

In a further method, a plurality of processes invoked by a program are determined. At least one of arguments, parameters, and addresses associated with at least one invoked process are determined. At least one argument, parameter, or address of the at least one invoked process is associated with a potential compliance issue, providing compliance results. A visual representation of the compliance results is output for display. The visual representation can indicate at least one potential compliance issue associated with at the least one argument, parameter, or address of a process invoked by the program.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
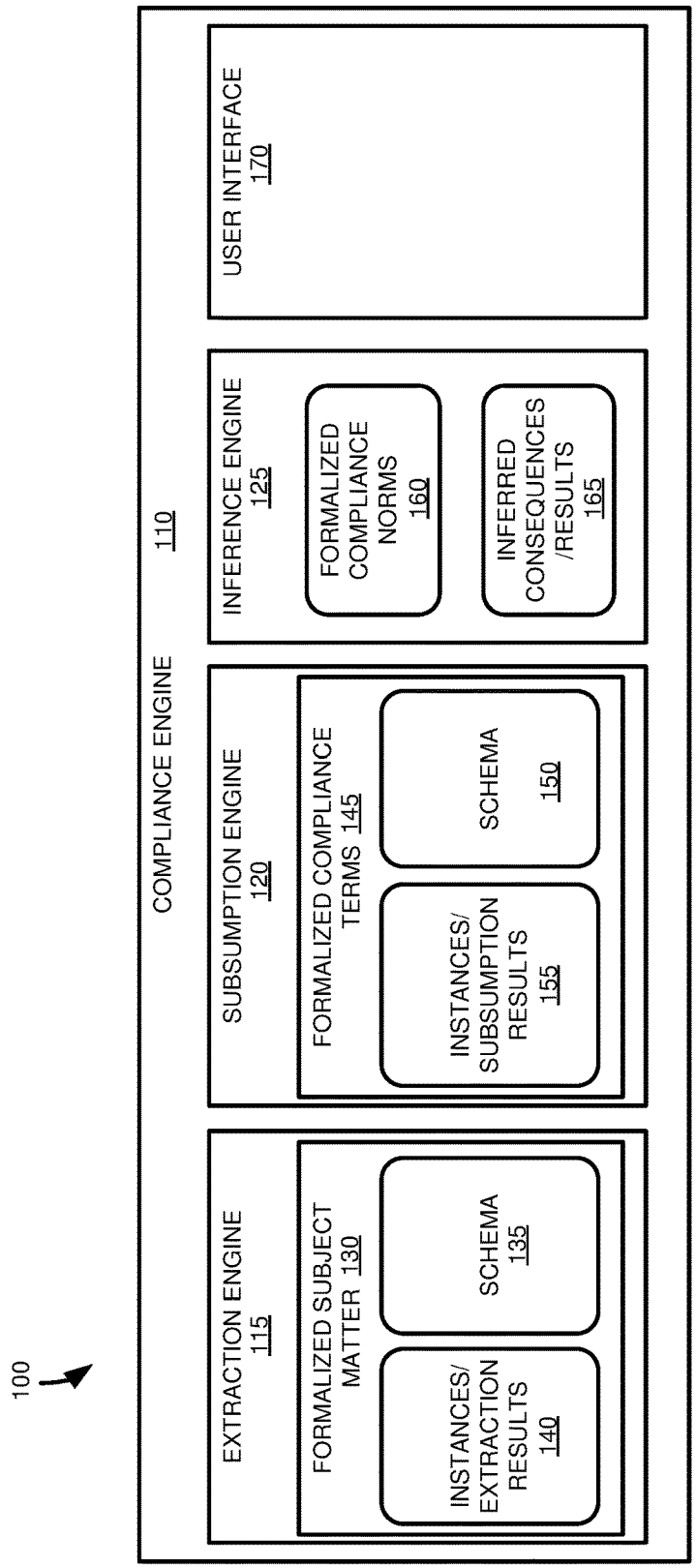
FIG. 1 is a schematic diagram illustrating how a compliance engine can be used to identify in a software program possible sources of noncompliance with a formalized compliance norm according to an embodiment of the present disclosure.

Society is becoming ever more data driven. Companies are able to track their operations at increasing levels of granularity. For individuals, as more and more of their activity takes place, or is tracked, in the digital world, their personal information is often recorded, used, shared, or sold. Even discounting nefarious activities such as hacking, phishing, malware, and viruses, a tremendous amount of information regarding individuals can be gathered through sources such as the websites an individual visits, their actions on the websites, and activity on social networks. Information stored by companies, such as banks, medical providers, and employers, can also be sensitive.

Individuals and governments are increasingly sensitive to the collection and use of personal information. Various laws have been passed to try and specify what information about an individual can be collected, how it can be collected, and how it can be used, shared, or sold. While such laws can be beneficial for individuals, it can be difficult for companies, and particularly the individuals working at companies, to be aware of all the various laws and regulations that might apply to their activities. Even if a company or employee is aware of a law or regulation, laws and regulations can be difficult to understand, and their ramifications may not be clear without additional context. Thus, even companies and employees wishing to comply with relevant laws and regulations regarding the use of personal information may find it difficult to determine whether their actions, or proposed actions, will be legally compliant.

In particular cases, a software developer or programmer may create or modify a software application or program that accesses data that may be subject to legal restrictions or requirements. For example, the program may access health or financial information that is protected by one or more laws or regulations. Although the innovations of the present disclosure are generally described with respect to personal data that may be subject to legal requirements, the innovations can be used with other types of legally protected or regulated information. The innovations can also be used with information that is the subject of some other type of monitoring or scrutiny, such as classified or confidential information of a company.

In some cases, such as when a developer has been working in a particular field for a significant period of time, and the software program under development is tailored to that specific field, a developer may be aware of at least some of the legal or other restrictions surrounding information that may be accessed, processed, or disseminated using the program. However, as laws and regulations are added and evolve, it can be difficult even for legal experts to be fully aware of all the rules that might apply to a particular action. In the case of less experienced developers, or software programs that are not tied to a specific use, the chance of noncompliance further increases.

Given budgets, deadlines, and staffing issues, is may be impracticable for suitably trained individuals, such as a legal expert, to review every software program in sufficient detail before it is released. A legal violation or other noncompliance may not be discovered until the software program is in use. At that point, the company responsible for the software program, and potentially its users, may be subject to liability or other consequences. For example, even if a company is not sued or otherwise subjected to legal proceedings for noncompliance, it can create public relations problems for the company, potentially costing the company customers, revenue, and investment.

The present disclosure provides for the automated identification of potential compliance issues, which can be a compliance issue with a law, regulation, or other legal requirement, or another type of regulation or policy, such as a corporate policy. These sources of potential compliance issues can be referred to as compliance sources, and can be represented as formalized compliance norms constructed from formalized compliance terms, as will be further discussed. A general framework 100 for this automated identification is provided in FIG. 1.

The present disclosure can provide various embodiments of a compliance engine, tool, component, or module 110 that can be used to determine, or assist in determining, whether a potential compliance issue may exist with an activity or proposed activity. The compliance engine 110 can include various components, including an extraction engine 115, a subsumption engine 120, and an inference engine 125. The extraction engine 115 analyzes one or more particular information sources, such as elements of a software program. The extraction results are represented as instances 140 of formalized subject matter 130 adhering to a formalized subject matter schema 135.

The instances 140 of the formalized subject matter 130 can represent the input to, output from, or processing performed by, a software program. The input may be, for example, data sources used by the software. Output may be information displayed or disseminated by the software program. In some cases, a particular type of input, such as a data source, may suggest that an output or use of the data implicates a compliance issue.

In other cases, the inputs to a software program, by themselves, may not be sufficient to reveal potential compliance issues associated with the software program. That is, processing may alter or combine information in a way that raises a potential compliance issue even if the individual data elements or data sources did not. Conversely, the processing may alter or combine information in a way that removes a potential compliance issue associated with one or more of the source data elements or data sources. For example, the health records of a particular individual may be subject to privacy laws or regulations. However, the bulk analysis of the health records of many individuals, stripped from the health records or identifying information of any particular individual, may not give rise to a potential compliance issue.

Some software programs may employ common elements, such as common code segments, data, data structures, methods, user interface elements, and the like. Some software programs may specify inputs (e.g., data sources), outputs (e.g., information output for display or transmitted to another computing device), or processing (e.g., methods, functions, remote procedure calls, application program interface calls) in a similar manner. The extraction engine 115 specifies what elements of the software program may be relevant to a compliance analysis, how to identify, extract, and store such elements.

After instances of the formalized subject matter 140 are extracted and associated with the schema 135, the formalized subject matter instances can be analyzed by the subsumption engine 120. The subsumption engine 120 can attempt to subsume, or relate, instances 140 of the formalized subject matter 130 to one or more formalized compliance terms 145. As an example, the formalized subject matter 130 may include instances of the formalized subject matter term "data" (such as specified in the schema 135), such as individuals' social security numbers stored in personnel files. The extraction engine 115 can specify how to retrieve this information from a software program and map it to the schema 135 to provide instances 140 of the formalized subject matter 130. The extraction engine 115 can also determine processes (methods) invoked by a program, including whether restricted data may be sent from, or received by, the process.

The subsumption engine 120 can determine whether a social security number is relevant to any of the formalized compliance terms stored in, or otherwise associated with, the subsumption engine, such as using the schema 150. For example, the formalized subject matter term of "personal data" (an instance of which may be a social security number) may be associated with a formalized compliance term used in determining compliance with one or more laws, regulations, or policies. A process invocation associated with transmission of the social security number using a web service can be populated as an instance of the formalized subject matter term of "transmission to third parties." In a particular example, the subsumption engine 120 can associate the instances 140 of the formalized subject matter 130 with particular compliance terms using a schema 150 to provide instances 155 of the formalized compliance terms (also referred to as subsumption results). The instances 155 can be stored by the subsumption engine 120.

The instances 155, or subsumption results, can be processed by the inference engine 125. The inference engine 125 can analyze the subsumption results 155 to determine whether they may raise any compliance issues using formalized compliance norms 160 stored by, or otherwise associated with, the inference engine 125. The formalized compliance norms 160 may be one or more rules or sets of conditions that determine the likelihood and nature of a compliance issue. For example, the formalized compliance norms 160 may determine a compliance result 165 (e.g., "lawfulness") based on the presence of, and relationship between, various formalized compliance terms 145.

The formalized compliance norms 160 may be, for example, laws, regulations, other legal requirements, corporate policies, other types of compliance sources, or combinations thereof. In some cases, the formalized compliance norms 160 can be defined, or otherwise provided by, a domain expert, such as a legal expert. The domain expert can, e.g., formalize a norm that defines and relates various formalized compliance terms. The domain expert can, for example, define a norm graph that defines and relates various entities (e.g. formalized compliance terms), such as objects and concepts, that may be relevant to a formalized compliance norm. That is, a formalized compliance norm 160 can be described using formalized compliance terms 145. The formalized compliance norms 160 can also include rules or definitions for determining the likelihood or presence of a potential compliance issue. For instance, the formalized compliance norms 160 can specify one or more of when a compliance issue will arise, is likely to arise, could arise, is not likely to arise, or will not arise.

In the example of a social security number, the social security number may be associated with a formalized subject matter term "data" by the extraction engine 115. The extraction engine 115 may determine that this instance of data is also associated with the formalized subject matter term "external transmission" (e.g., from a process invoked by the program). The subsumption engine 120 may subsume these formalized subject matter instances within the formalized compliance term of "transmission to third parties." The inference engine 125 can determine what compliance scenarios or norms (e.g., particular laws, regulations, policies, etc.) are implicated by, or contain, "transmission to third parties."

The inference engine 125 can determine, such as in relation to other elements of the subsumption results 155 (such as any processing performed on the social security numbers or other information transmitted along with the social security numbers) whether a compliance issue may exist. In some cases, the inference engine 125 can provide a determination of whether or not a compliance issue may exist. In other cases, the inference engine 125 may provide an indication of whether a compliance issue may exist, such as highlighting, or another visual indication, formalized compliance terms that may be of concern.

A user, such as through a user interface 170, may be provided with inferred compliance consequences or results 165. The inference results 165 can include information regarding the subsumption results 155 and relevant formalized compliance norms 160 in order for the user to make a final determination of whether a software program is compliant (or, whether the software program should or can be executed in its current form, or if changes should be made in order to improve compliance).

In some cases, information regarding the formalized compliance norms 160 can be provided to assist the user in analyzing a potential compliance issue. For example, by selecting an inference result 165, a user may be presented with information regarding a particular law, regulation, policy, etc. relating to the potential compliance issue. The information can include the relevant text, or an explanation or analysis of the text, associated with the compliance source, which may be useful for the user in understanding how the functionality of the software program may give rise to a compliance issue. In some implementations, the user interface 170 may present a user with suggested actions to address any potential compliance issue.

Example 2—Example Compliance Analysis

Figure 2:
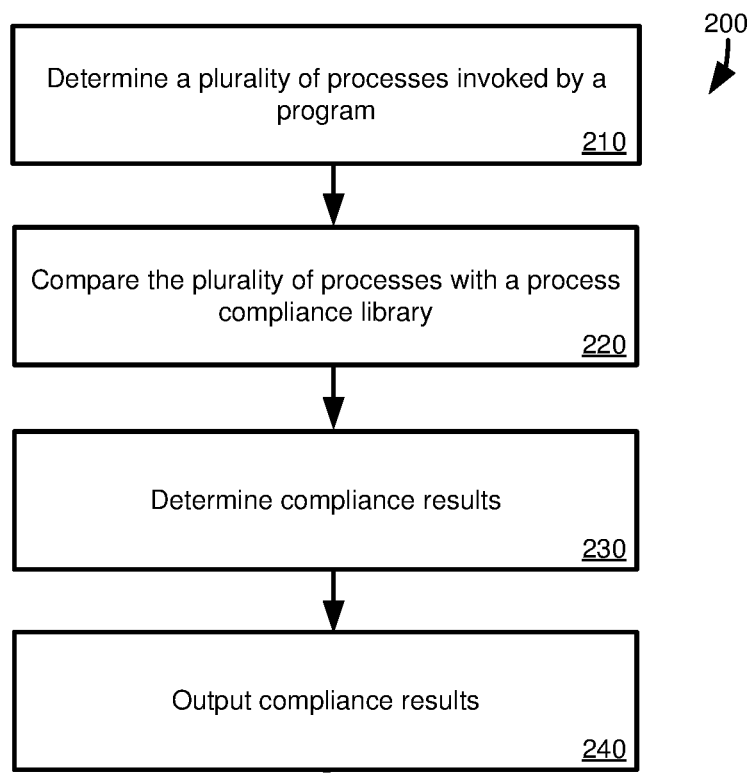
FIG. 2 is a flowchart of a method for analyzing at least a portion of processes invoked by a program for potential compliance issues.

FIG. 2 illustrates a flowchart of an example method 200 for carrying out a compliance analysis, such as using the framework 100 of FIG. 1. At 210, a plurality of processes invoked by a software program are determined. In some cases, additional, or other, types of instances of formalized subject matter associated with a software program can be determined, such as data sources used by the software program, including sources of data sent to, or received from, one or more of the plurality of processes. The formalized subject matter instances can include user input receivable by the software program and output operations performable by the software program, such as transmission of data over a network, printing operations, and displays that may be generated by the software program.

At 220, the plurality of processes are compared with a process compliance library. The process compliance library can include processes that are known not to be associated with potential compliance issues, that are known to be associated with a potential compliance issue, whose compliance status is unknown, or combinations thereof. In some cases, the plurality of processes can be associated with one or more formalized compliance terms. A formalized compliance term can be a particular aspect of a particular formalized compliance norm.

Compliance results are determined at 230. The compliance results can include a warning if a process of the plurality of processes is in the compliance library and represents a process known to possibly be associated with a potential compliance issue. In other cases, the compliance results can include a warning if a process of the plurality of processes is not in the compliance library, where the processes in the compliance library are known not to raise potential compliance issues.

The compliance results are output at 240. In some cases, the compliance results can include an analysis of formalized compliance terms (and/or instances of formalized subject matter) using at least one formalized compliance norm to provide inferred compliance results. For example, formalized compliance terms associated with the formalized compliance norms can be analyzed to determine whether a compliance norm is, or potentially may be, violated, which could lead to a compliance issue.

Example 3—Example Advantages

The disclosed innovations can provide a number of advantages. For example, they can make it easier for developers to determine whether their programs may result in potential compliance issues. Manually determining process invocations can be time consuming and error prone. Once process invocations are determined, the innovations can facilitate determining compliance with one or more formalized compliance norms. Multiple norms can be analyzed using the invoked processes, again saving the developer time. The developer can be provided with information regarding potential sources of noncompliance, as well as information to help the developer adjust a program so that it is compliant.

Example 4—Example Ontology and Formalized Subject Matter

Figure 3:
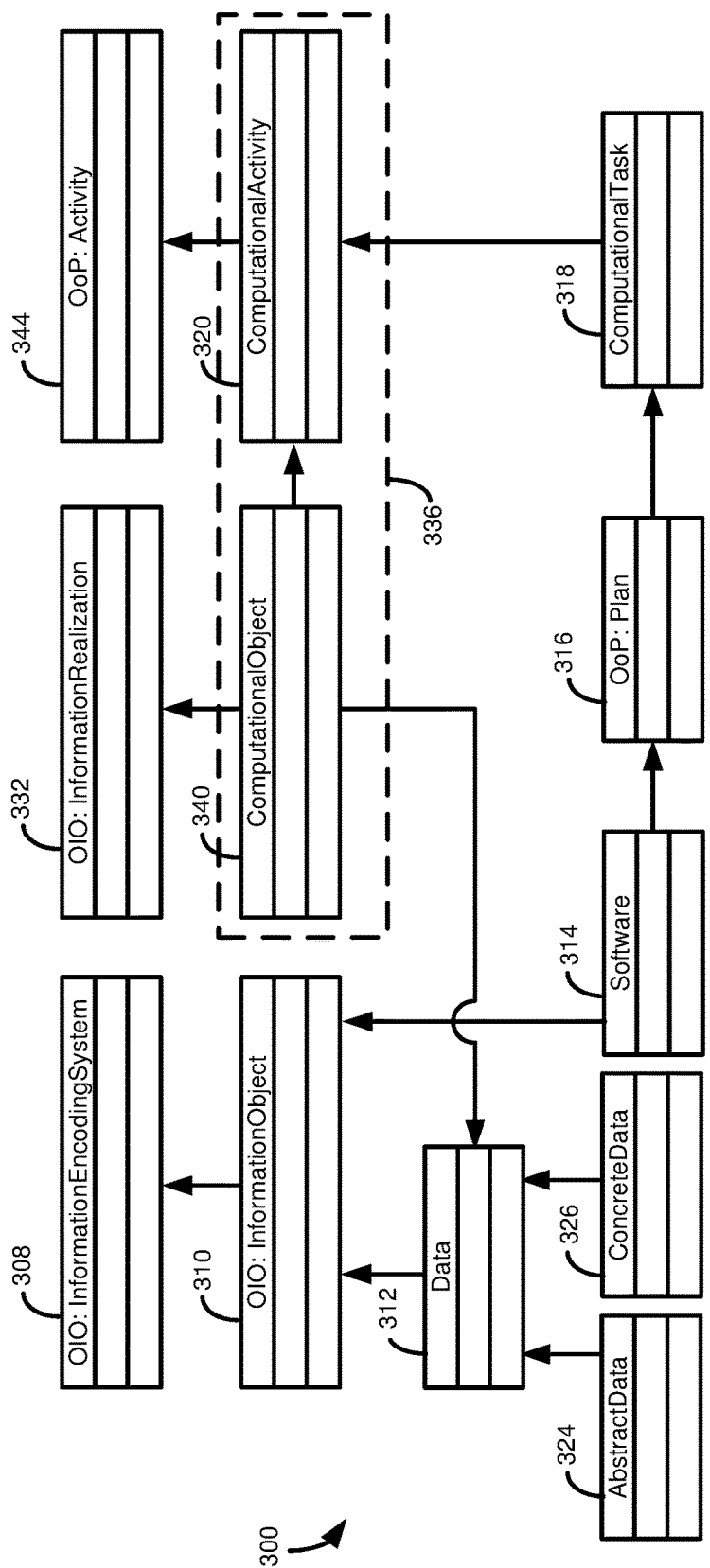
FIG. 3 is a diagram schematically depicting an ontology describing relationships between ontological elements associated with the execution of a software program.

FIG. 3 schematically depicts an example ontology 300. The ontology 300 can be used, for instance, in the extraction engine 115 of FIG. 1, such in (or as) the schema 135. The ontology 300 is provided to help illustrate automated compliance determination, but should not be considered limiting in any way. That is, the specific components of the ontology 300, and their interrelation, may differ from that shown in FIG. 3. In addition, in at least some cases, the formalized subject matter 130 of the extraction engine 115 need not be in an ontology, or otherwise have the format shown in FIG. 3. It should be appreciated that the ontology 300 is presented as an aid for understanding the present disclosure. In practice, the ontology 300, or another representation of formalized subject matter, would normally be stored in a computer-executable format, such as code implementing the objects and relationships shown in the ontology 300.

Elements of the ontology 300 can be aligned under a set of foundational ontologies. The foundations ontologies include an Ontology of Information Objects (OIO), an Ontology of Plans (OoP), and a Descriptive Ontology for Linguistic and Cognitive Engineering (DOLCE). InformationObjects can be entities that exist in an information or computing system, as opposed to analog entities. The Ontology of Plans can be used to provide a theory of plans, generally, that can be used to characterize planning concepts, including modelling workflow information.

A member of the OIO can be InformationEncodingSystem 308, which can be used to order InformationObjects 310. For instance, the encoding of a particular class in C++ can be an InformationObject 310. The InformationObject 310 may be ordered by (e.g., the OIO:orderedBy operation) the C++ programming language, a particular InformationEncodingSystem 308. In turn, InformationObjects 310 may include Data 312 or Software 314. Software 314 can be an InformationObject 310 that expresses a Plan 316 under the OoP ontology. The Plan 316 may define a ComputationalTask 318, that in turn sequences a Computational Activity 320.

Data 312 may present information that can be manipulated, but which does not express a plan. That is, unlike Software 314, Data 312 does not direct computing activities, but rather may be the subject of computing activities. Data 312 can include AbstractData 324 and ConcreteData 326. AbstractData 324 can be data that identifies something other than itself, such as the identity of an individual. In at least some cases, AbstractData 324 (e.g., personal information of an individual) can be subject to laws, regulations, policies, or other compliance sources that may result in compliance issues. An example of ConcreteData 326 can be, for example, integers that can be manipulated (e.g., subject to mathematical operations), such as by a program.

Another element of the Ontology of Information Objects is InformationRealization 332, which can be produced by the results of a ComputationalDomain 336 formed by the interaction of a ComputationalObject 340 with a ComputationalActivity 320. The ComputationalActivity 320 can be a member of the Activity class 344 of the Ontology of Plans. A ComputationalObject 340 can represent the realization of code by execution of the code on (or embedded in) physical computing hardware. In at least some cases, ComputationalObjects 340 can also be classified as PhysicalEndurants under the DOLCE ontology, as, for example, they can be stored in a persistent storage medium (e.g., hard disk) or reside in memory.

A ComputationalObject 340 can be an instance of a class (or other object) that can be interpreted and executed by a CPU. ComputationalObjects 340 may not include, for example, a program, code, or code elements (e.g., classes or objects) that are stored (digitally or by analog means (e.g., written on paper)), or exist as an abstract concept, but are not actively running programs (e.g., programs or code in execution). ComputationalObjects 340 can realize Data 312. For example, Data 312 can serve as input or output to a ComputationalActivity 320.

A ComputationalActivity 320 can represent a running computing system, resulting from the execution of a ComputationalObject 340. A ComputationalActivity 320 can represent software as manifested by a series of computational steps, such as altering variables, receiving input, outputting information, interacting with input/output devices, and the like. In specific cases, a ComputationalActivity can include the invocation of a process carried out on a remote computing system, such as a request for a web service or other network based service (e.g., a remote procedure call (RPC), a simple object access protocol request (SOAP), or a representation state transfer request (REST)).

As explained above, the ontology 300 is provided by way of example only. However, the ontology 300 demonstrates how elements of the ontology can be mapped to particular instances of formalized subject matter to help determine whether a compliance issue may exist. For instance, a rule can be developed that indicates that compliance should be further investigated if a program is found to access AbstractData 324 (such as personal information, including the formalized compliance term AbstractData occurring with other instances of formalized compliance terms). Or, a rule can be defined that states that compliance should be further investigated if a program is found to access Abstract Data 324 (or, certain types of AbstractData, such as AbstractData that may be personal information) and a ComputationalActivity 320 of transmitting the AbstractData is identified, such as by subsuming instances of formalized subject matter elements under a compliance term (such as "transmission to third parties," such as used in the German Data Privacy Action or the European Data Privacy Act).

In another case, a subsumption process may result in compliance needing not to be further investigated, such as if the program accesses AbstractData 324, but a ComputationalActivity 320 manipulates the AbstractData in a way that removes potential compliance issues (such as by aggregating the data or removing identifying information). For instance, the ComputationalActivity 320 may prevent formalized subject matter instances of AbstractData 324 from also being subsumed under a formalized compliance term of "ProtectedData."

Example 5—Example Formalized Compliance Terms and Formalized Compliance Norms

Figure 4:
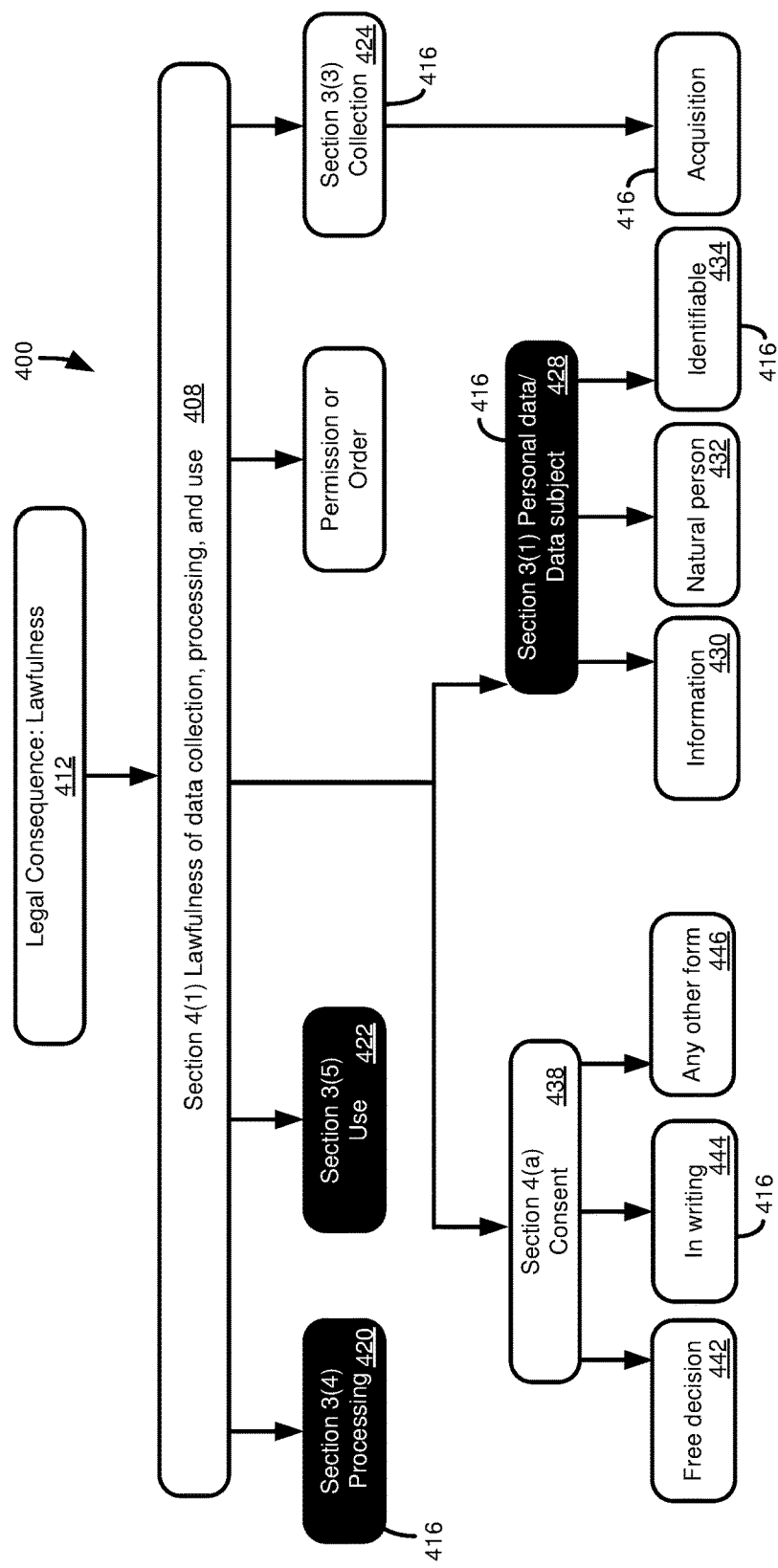
FIG. 4 is a norm graph illustrating the relation of formalized compliance terms associated with a formalized compliance norm.

FIG. 4 illustrates elements of an example formalized compliance norm 400. The formalized compliance norm 400 is a particular law or regulation 408 (e.g., the German Data Privacy Act or the European Data Privacy Act) regarding the lawfulness of collection, processing, and use of personal data. The ultimate outcome of the formalized compliance norm 400 may be a determination of a legal consequence 412, which can be whether an activity or proposed activity (such as an activity carried out at least in part using a software program) is lawful.

The law or regulation 408 can be parsed into a number of constituent elements 416, which may be formalized compliance terms. At least a portion of these formalized compliance terms 416 can be used to subsume instances of formalized subject matter in a schema or ontology, such as the ontology 300 of FIG. 3. While, in at least some cases, inputs to, outputs from, and processing performed by a software program (collectively referred to as program information) can be directly evaluated with respect to the formalized compliance terms 416 of the formalized compliance norm, it may be advantageous to map the instances of the formalized subject matter to a schema or ontology, and then determine whether the schema elements (and their associated instances) can be subsumed under a formalized compliance term.

For example, the program information can be mapped to an ontology (representing formalized subject matter), which in turn may be subsumed under one or more formalized compliance terms. In turn, the formalized compliance terms can be analyzed using one or more formalized compliance norms to infer whether a potential compliance issue may exist. Thus, the program information can have a single mapping to the schema, rather than having to be mapped to multiple, individual formalized compliance terms or formalized compliance norms, which may use different terminology. In addition, mapping the program information to a schema or ontology can allow for greater extensibility, as formalized compliance terms and formalized norms can be added to an analysis simply by defining the appropriate subsumption schema and rules for evaluating the formalized compliance terms using the formalized compliance norm.

Returning to FIG. 4, law or regulation 408 can include formalized compliance terms representing one or more definitions. In some cases, a definition can be supplied by the law or regulation 408 itself. In other cases, the definition can be supplied from another source, such as another legal resource or a legal expert. As an example, FIG. 4 includes a definition 420 for "processing." In this example, definition 420 is supplied by Section 3(4) of the law or regulation 408 (e.g., the German Data Privacy Act). The definition may provide details about what kind of actions may constitute the kind of processing that is or is not covered by the law or regulation 408, or which may or may not give rise to a compliance issue. In at least some implementations, a definition, such as the definition 420, can be used to subsume one or more elements of formalized subject matter, such as through a schema or ontology. For example, "processing" may be associated with instances of formalized subject matter associated with the ComputationalTask 318 or ComputationalActivity 320 elements of the ontology 300 of FIG. 3. Similarly, the formalized compliance norm 400 can include definitions (formalized compliance terms 416) for "use" 422 and "collection" 424.

A formalized compliance term 416 providing a definition can, in some cases, be parsed into multiple subelements, or otherwise related to other formalized compliance terms. Definition 428 relates to the definition of personal data or a data subject (e.g., an individual associated with, such as identifiable from, personal data). The definition 428 has subelements of information 430, natural person 432, and identifiable 434. In some cases, subelements can be additional definitions provided by the law or regulation 408. In other cases, subelements can represent definitions provided by another authority or expert, or can represent particular elements that should be considered in determining whether a compliance issue may exist.

In a specific example, information 430 may be "information concerning the personal or material circumstances of an identified or identifiable individual (the data subject)." Thus, program information, instances of formalized subject matter, may not meet the definition of formalized compliance term 428 if the information does not relate to "personal or material circumstances." The definition of formalized compliance term 428 also may not be met if the information does not relate to a natural person, such as if the information relates to an entity (such as a corporation), a group of individuals, or relates to non-human subject matter.

Even if the information relates to "personal or material circumstances" and a "natural person," in order for a compliance issue to potentially be raised by the formalized compliance norm 408, information must still relate to "an identified or identifiable individual." Thus, for example, if salary data was retrieved from a database, for either a group of individuals or a particular individual, that information would not give rise to a potential compliance issue unless the name, social security number, or similar identifying information was also program information (and, even then, further analysis of the program information may reveal other reasons why a compliance issue is not raised).

Formalized compliance terms of the law or regulation 408 can, alone or in combination, be relevant to the determination of whether a compliance issue may exist. For example, in the context of the collection, processing, and use of personal data, an otherwise prohibited or regulated activity may be permitted (or regulations or restrictions removed) if the relevant individual (or another authorized person) provides "consent" 438. Instances of formalized subject matter (or program information) can be mapped to these types of formalized compliance terms 416 as well. For instance, a ComputationalObject 340 might be a class that implements a consent form, or an instance of Data 312 might be a consent flag indicating whether consent has been obtained, and this formalized subject matter subsumed under the "consent" formalized compliance term 438. Thus, rules can be defined where the presence of "consent" 438 indicates that a compliance issue is not raised, but the absence of consent indicates a potential compliance issue, or that further analysis should be undertaken.

A formalized compliance term 416 can be related to other formalized compliance terms. For example, "consent" 438 may include, or be related to, a formalized compliance term 442 representing whether consent was a free decision of the individual, a formalized compliance term 444 representing when consent should be in writing, and a formalized compliance term 446 specifying circumstances is which written consent may not be required. One or more of the formalized compliance terms 442, 444, 446 may be used to subsume formalized subject matter, such as through a schema or ontology, or directly to program information, and the formalized compliance terms evaluated using one or more rules to determine whether a compliance issue may exist. In some cases, an instance of formalized subject matter may be subsumed under more than one formalized compliance term. For example, an electronic indication of consent may be related to both "consent" 438 and "any other form" 446.

As discussed above, all or a portion of the formalized compliance terms 416 can be used to subsume program information, including indirectly through formalized subject matter. In some cases, all or a portion of the mapped formalized compliance terms 416 can be automatically analyzed using one or more rules (representing one or more formalized compliance norms) to determine whether a potential compliance issue may exist. After the automatic analysis, a user may be provided with analysis results, optionally including a determination of whether a compliance issue is likely, additional considerations for evaluating a potential compliance issue, or potential actions to mitigate potential compliance issues.

In some cases, the potential relevance of all or a portion of the formalized compliance terms 416 to a potential compliance issue may be left for a user to determine. That is, in some cases, rules need not be provided, or rules provided such that an analysis of one or more formalized compliance terms 416 is performed, but an ultimate conclusion (e.g., whether or not a compliance violation exists) is not reached. A user may thus be provided with information about the program information and how it relates to the formalized compliance norm 400, from which the user can then manually determine the likelihood of a compliance issue.

Even in cases where no rules are provided, and a user manually determines the impact of program information subsumed under formalized compliance terms 416, presenting the results of the subsumption (in the format shown in FIG. 4 or some other format) can provide advantages. For example, formalizing the law, regulation, or policy giving rise to a potential compliance issue can make it easier for a user, particularly a user who is not a legal expert regarding the compliance issue, to understand how the formalized compliance terms 416 ultimately impact the compliance decision 412. Similarly, by subsuming program information (including through formalized subject matter, such as using a schema or ontology) under the formalized compliance terms 416, the user is altered to which elements of program information are associated with particular components (e.g., formalized compliance terms 416) of the formalized compliance norm 400, which can identify and narrow down the issues the individual need analyze to make their determination of whether a compliance issue is raised.

In some cases, all or a portion of the formalized compliance norm 400 can be presented to a user, such as on a display. The user may, for example, be able to view the relevant text, or an analysis or discussion of the text, of the formalized compliance norm 400 by selecting (e.g., clicking) one of the formalized compliance terms 416. Selection of a particular formalized compliance term 416 can result in a display of other content, such as one or more rules relating to the element, an analysis of one or more rules relating to the element, or a display of program information mapped to the element (optionally including an intermediate mapping to an ontology).

When presented in a display, information associated with the formalized compliance norm 400 can be presented with visual indications of the status of the formalized compliance terms 416, and the overall consequence 412. For example, formalized compliance terms 416, such as terms 420, 422, 428, under which program information has been subsumed, or which are associated with a particular rule or rule element that indicates a compliance issue may be present, may be presented in a first visual style, such as a first color. Formalized compliance terms 416, such as terms 412, 424, 430, 432, 434, 438, 442, 444, 446, that are not present, or which are associated with a particular rule indicating that a compliance issue is not present (or, at least not indicating that the issue is present), can be presented in a second visual style, such as a second color.

Formalized compliance terms 416 that have not been determined (for example, program information has been subsumed under a formalized compliance term, but a determination cannot be made (such as because other formalized subject matter needed for a subsumption operation is not present), or it cannot be determined whether program information can be subsumed under the formalized compliance term) can be presented in a third visual style, such as a third color. In this way, a user may quickly identify areas of potential safety or concern, and, optionally select formalized compliance terms 416 that are unresolved or of potential concern.

Formalized compliance norms can be used to create rules that determine whether a compliance issue may exist. For example, a rule associated with FIG. 4 might be expressed as:

((Collection(X) OR Processing (X) or Use(X))
AND
performedUpon (X,Y) AND Personal Data (Y))
AND
(Permission(P) OR Order (P)) AND givenFor (P,X))
OR
(Consent (C) AND Data Subject(D) AND about (Y,D) AND gives (D,C) AND
permits (C,X))
→
Lawfullness(A) AND givenFor(A,X)

Where X, Y, P, C, D, and A are variables that represent instances of the relevant formalized compliance term. For example, X can represent a particular collection and D can represent a particular data subject (e.g., an individual). These rules and relations can be implemented in code, and the variables instantiated with particular values associated with a particular software program.

Figure 5:
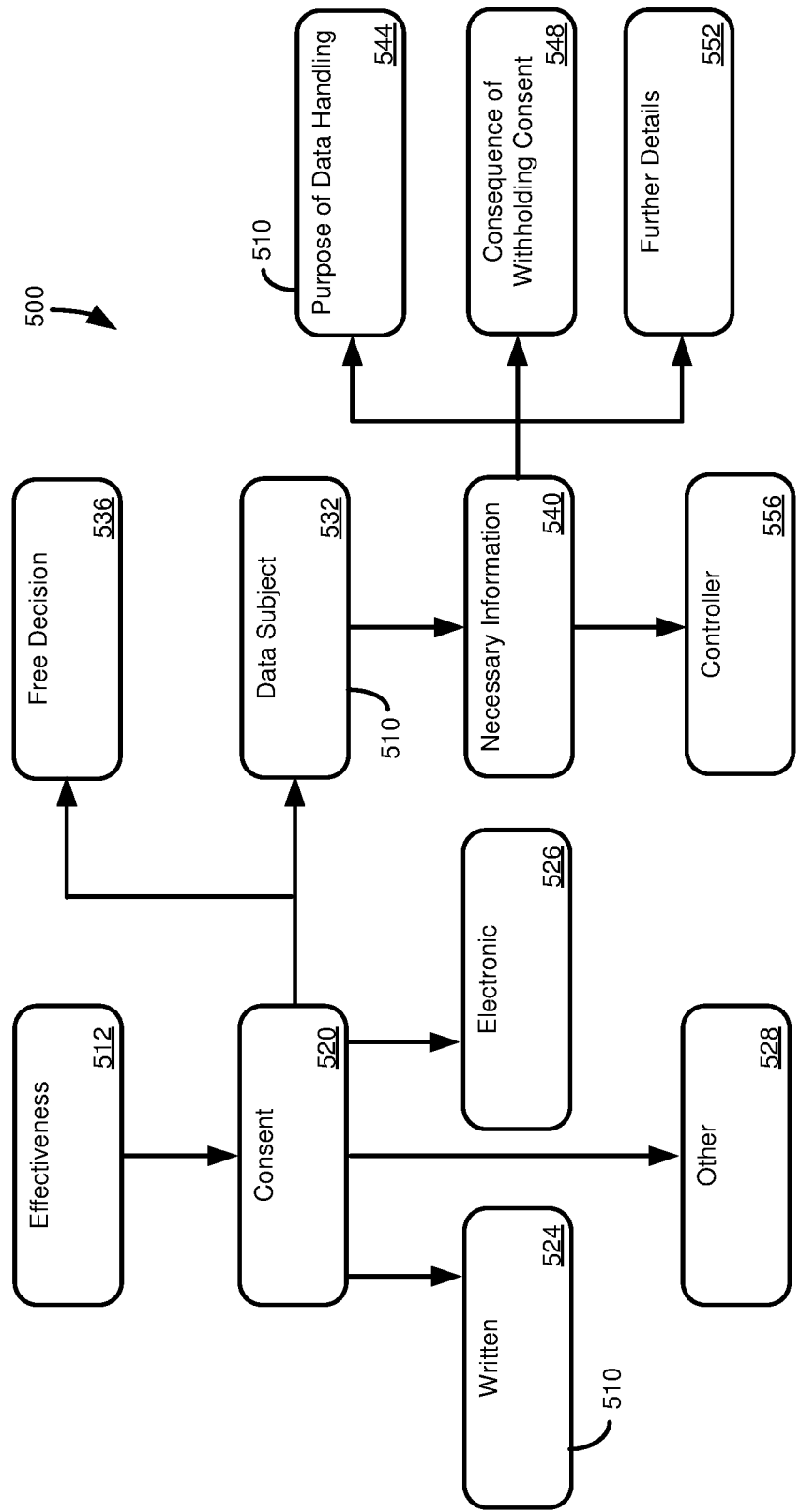
FIG. 5 is a norm graph illustrating additional details of formalized compliance terms associated with FIG. 4.

FIG. 5 presents an example view of a formalized compliance norm 500 (including component formalized compliance terms 510) that may represent, for example, more detailed, granular, or alternative information that may be presented to a user regarding the formalized compliance norm 400 of FIG. 4. For instance, the formalized compliance norm 500 may be presented when a user selects one of the formalized compliance terms 416 of FIG. 4. In particular, the formalized compliance norm 500 may represent a display presented to a user after user-selection of the "consent" term 438.

The formalized compliance norm 500 may include a plurality of formalized compliance terms 510, at least some of which may be, or be related to, one or more of the formalized compliance terms 416 of FIG. 4. In particular, "consent" term 520 may be, or be related to, "consent" term 428. The formalized compliance norm 500 may represent, for example, whether "consent" term 520 is effective, or otherwise capable of negating a potential compliance issue. The formalized compliance norm 500 may include a conclusion or outcome 512, such as whether consent has been given or whether consent is effective.

Determining whether consent exists, or is effective, may be based on a form in which consent has potentially been given. For example, it may be possible for consent to be given in written form 524, electronic form 526, or some other form 528 (e.g., visual, verbal). Whether "consent" 520 is valid may also be determined based on who the consent was potentially given by, and under what circumstances. For instance, the formalized norm 500 indicates that consent 520 should be provided by the data subject 532 (instead of, for example, an agent, guardian, parent, spouse, or the like). Formalized compliance norm 500 also indicates that consent 520 is determined based on whether the consent was a free decision 536 (as opposed to consent given under duress or compulsion).

FIG. 5 indicates additional conditions that must be met (e.g., formalized compliance terms 510 that must be present) for effective consent. The data subject 532 may need to be provided with, and understand, predicate, necessary information 540. For example, the data subject 532 may need to be informed of the purpose of the data handling 544, the consequences of providing or not providing consent 548, and any further details 552 that may be relevant to whether the data subject 532 should provide consent. In some cases, the necessary information 540 can be supplied by a controller 556.

As with the display of the formalized compliance norm 400 of FIG. 4, in at least some cases, a user may be able to obtain additional information regarding the formalized compliance norm 500 by selecting (e.g., clicking on) one of the formalized compliance terms 510. The additional information presented may include one or more of whether program information has been subsumed under the formalized compliance term 510, the relation of the formalized compliance term to one or more compliance rules, or relevant text, or a discussion of the relevant text, of a compliance source associated with the formalized compliance norm 500. Also similarly to the norm 400, a display of the formalized compliance norm 500 can display formalized compliance terms 510 in different visual styles (e.g. colors), depending on whether a formalized compliance term 510 has program information subsumed under it, is associated with a rule, or may or may not be associated with a potential compliance issue.

The views presented in FIGS. 4 and 5 can be interactive. For example, as indicated above, the compliance terms 416, 410 can have a status. In some cases, a user may wish to alter the status of a compliance term 416, 510. For example, for terms 416, 510 that were initially unknown, the user can select to alter the term status (such as by clicking on the term). The view can then change based on the user input, such as by updating other terms 416, 510, or changing a compliance conclusion associated with the graph. The user can update the view as the user attempts to gain compliance for a program, thus interactively updating the view to learn whether the software is compliant, terms 416, 510 that still give rise to noncompliance, or information on actions needed to reach compliance.

Example 6—Example Program Information

Figure 6:
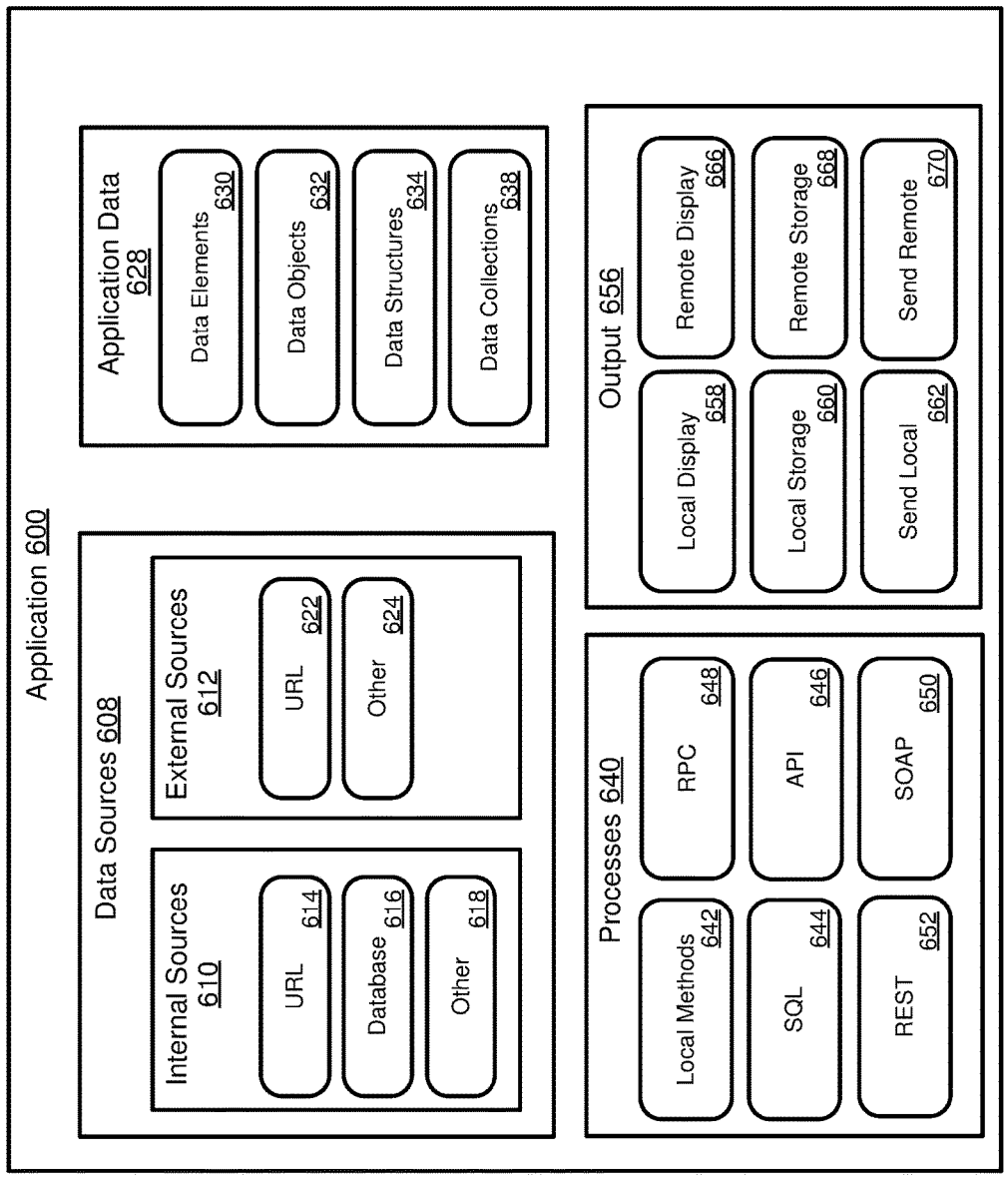
FIG. 6 is a block diagram illustrating components of a software application according to an embodiment of the present disclosure.

As discussed above, program information (e.g., input to, output from, and processing performed by a software program) can be evaluated in view of a formalized compliance norm to determine whether a compliance issue may exist. FIG. 6 is a schematic diagram of a program or application 600 illustrating potential sources of program information (which can be directly associated with formalized compliance terms or processed to provide instances of formalized subject matter, such as being mapped to a schema or ontology, and then subsumed under the formalized compliance terms).

The application 600 can include data sources 608. The data sources 608 can include internal data sources 610 and external data sources 612. Internal data sources 610 can include data sources accessible through URLs 614, data maintained in a database 616, and other data sources 618. Other data sources 618 can be, for example, data stored in memory associated with the application 600 or in persistent storage (e.g., a hard disk) accessible by the application.

External data sources 612 can include resources available through URLs 622 or other data sources 624. Other external data sources 624 can be, for example, data maintained on another computing system, such as in persistent storage or a database of the other computing system, which may be accessed by the application 600, such as using network requests.

In some cases, data can be identified as possibly giving rise to a compliance issue depending on whether it is from an internal data source 610 or an external data source 612. For example, it may be known that internal data sources 610 will not give rise to compliance issues. Or, internal data sources 610 can be classified or labelled as to whether they may give rise to a compliance issue, or otherwise be associable with one or more formalized compliance norms. Certain tables or records may be known to include personal data, such as income, social security numbers, medical data, or the like, which may give rise to compliance issues if handled improperly. The internal data sources 610 can be mapped to formalized subject matter in some cases.

In some aspects, external data sources 612, or particular types of external data sources, can be flagged as potentially giving rise to a compliance issue, or otherwise associated with one or more formalized compliance norms (such as being represented as formalized subject matter instances and then subsumed under formalized compliance terms). It can be more difficult to know whether information obtained from an external data source 612 may give rise to a compliance issue. For example, if the application 600 is allowed to access external URLs 622, it may be difficult to predict what kind of information may be received. Thus, in some implementations, all information from an external data source 612, or particular types of information (e.g., information from URLs 622 or particular URLs) be may flagged as potentially giving rise to a compliance issue, mapped to formalized subject matter, which in turn may be mapped to (subsumed under) one or more formalized compliance terms associated with a formalized compliance norm, and optionally rules, to determine whether a compliance issue may exist.

Knowing the data sources 608 used by an application may not be sufficient to determine whether a compliance issue may exist. For example, data may be maintained in an aggregated form that could lead to a compliance issue, but may be processed or output in a way that reduces or eliminates potential compliance issues. Conversely, data may be maintained in a way that does not, by itself give rise to a compliance issue, but could be manipulated into a form that could give rise to a compliance issue. While names and social security numbers, maintained in separate tables, may not give rise to a potential compliance issue, when combined, the resulting data may give rise to a compliance issue.

Accordingly, in some aspects, application data 628 can be evaluated in determining potential compliance issues. Application data 628 can represent data generated from the data sources 608 during execution of the application 600, or otherwise associated with the application. Application data 628 can include individual data elements 630 (e.g., variables, records), data objects 632 (e.g., a collection of variables or records, such as abstract data types (e.g., classes)), data structures 634 (e.g., queues, lists, heaps, stacks, binary search trees, graphs, and the like), and other types of data collections 638.

To illustrate how information from the data sources 608 that may give rise to a compliance issue can be used by the application in a way that does not give rise to a compliance issue, consider an internal data source 610 that includes records for individuals, with each record including the individual's name, social security number, and medical history. Aspects of the medical history, such as the performance of a particular medical procedure, are stored as data elements 630, but not the name or social security number of the corresponding individual. Thus, the application data 628 is not likely to give rise to a potential compliance issue, even though the data sources 608 included information that could give rise to a potential compliance issue.

In the opposite scenario, the name, social security number, and medical history of individuals may be stored in the internal data source 610 as individual elements. If the elements were combined by the application into a data object 632, the data object may give rise to a potential compliance issue even if the information in the internal data source 610 did not. Without analyzing the application data 628 and the data sources 608, a potential compliance issue may go undetected. Subsumption can be used to determine whether program information (including as instances of formalized subject matter) can be associated with a formalized compliance term, which in turn can be evaluated using rules for a formalized compliance norm to determine whether a potential compliance issue may exist.

Application data 628 can affect a compliance analysis in other ways. Application data 628 may indicate circumstances that increase or decrease the probability of a compliance issue. Using the example of personal data that can be collected and used with consent, a data element 630 (or other type of application data 628) can be associated with consent. Examples of data elements 630 that can be associated with consent include consent forms or variables representing whether consent has been given, such as a flag or Boolean variable. In some cases, consent can be collected by the application 600, such as in response to user input (e.g., clicking a consent user interface element indicating that they granted consent).

Processes 640 invoked by the application 600, including processes carried out by the application or on behalf of the application (e.g., processes carried out at a remote computing system, such as using a web service) may also be analyzed to determine whether a software program is likely to result in a compliance issue. As discussed above, information can be processed such that it is more or less likely to give rise to a compliance issue. Various types of processes can be analyzed, including local methods 642 (e.g., methods associated with abstract data types, such as classes), SQL operations 644 or other database operations, application program interface calls 646, remote procedure calls 648, SOAP operations, 650, and REST operations 652.

One or more of the processes 640 can be subsumed under a formalized compliance term and/or other program information (including through subsumption of the processes 640 as represented as instances of formalized subject matter), to be analyzed in making a compliance determination. For instance, the combination of an internal data source 610 representing a personal record associated with a local method 642 performing a disaggregation operation may be associated with reduced compliance risk for a formalized compliance norm (e.g., it may no longer be subsumed under a required formalized compliance term).

Processes 640 carried out by, or on behalf of, the application can affect a compliance determination in other ways. Application data 628, by itself, may not be particularly likely to give rise to a compliance issue if it is maintained and used within a single organization, for example, such as an organization having permission to use the data. However, processes 640 carried out by an outside computing system, at the request of the application, can give rise to a compliance issue, such as if protected data is sent to the outside computing system, or if the processes carry out operations that transmit data to other outside computing systems.

Output 656 associated with the application 600 may also be used in determining potential compliance issues. While certain formalized compliance norms may be associated with data collection, or data processing, others may be concerned with information dissemination. Output 656 can include information output for local display 658, which could be on a screen or a printer, information stored on local storage 660 (e.g., local persistent storage, such as a hard disk or flash memory), or information sent locally 662. Information sent locally can include information sent within a local computing system, such as a company intranet.

Output 656 can also include remote output, such as on a remote display 666, storage on remote storage 668, or remotely sent data 670, such as data sent to a remote or external computing system. Remote display 666, storage 668, or sending 670 can include actions such as providing access to the information via the internet, including posting the information to a social networking site, a blog, or a public internet site (including a corporate website made available to external users).

In some cases, determining whether a compliance issue may exist based on a formalized compliance norm can depend on the nature of the output 656, including whether the output is external or internal. In the case of personal data, output 656 output remotely may generally be more likely to give rise to a potential compliance issue. Program information in the form of output 656 can be combined with other types of program information in determining whether a compliance issue may exist. For example, a rule can be defined (such as using a formalized compliance term) whereby information from a particular data source 608, when sent remotely 670, may give rise to a potential compliance issue, but the information does not give rise to a potential compliance issue if not output or output in another manner.

Example 7—Example Program Information Ontology

Figure 7:
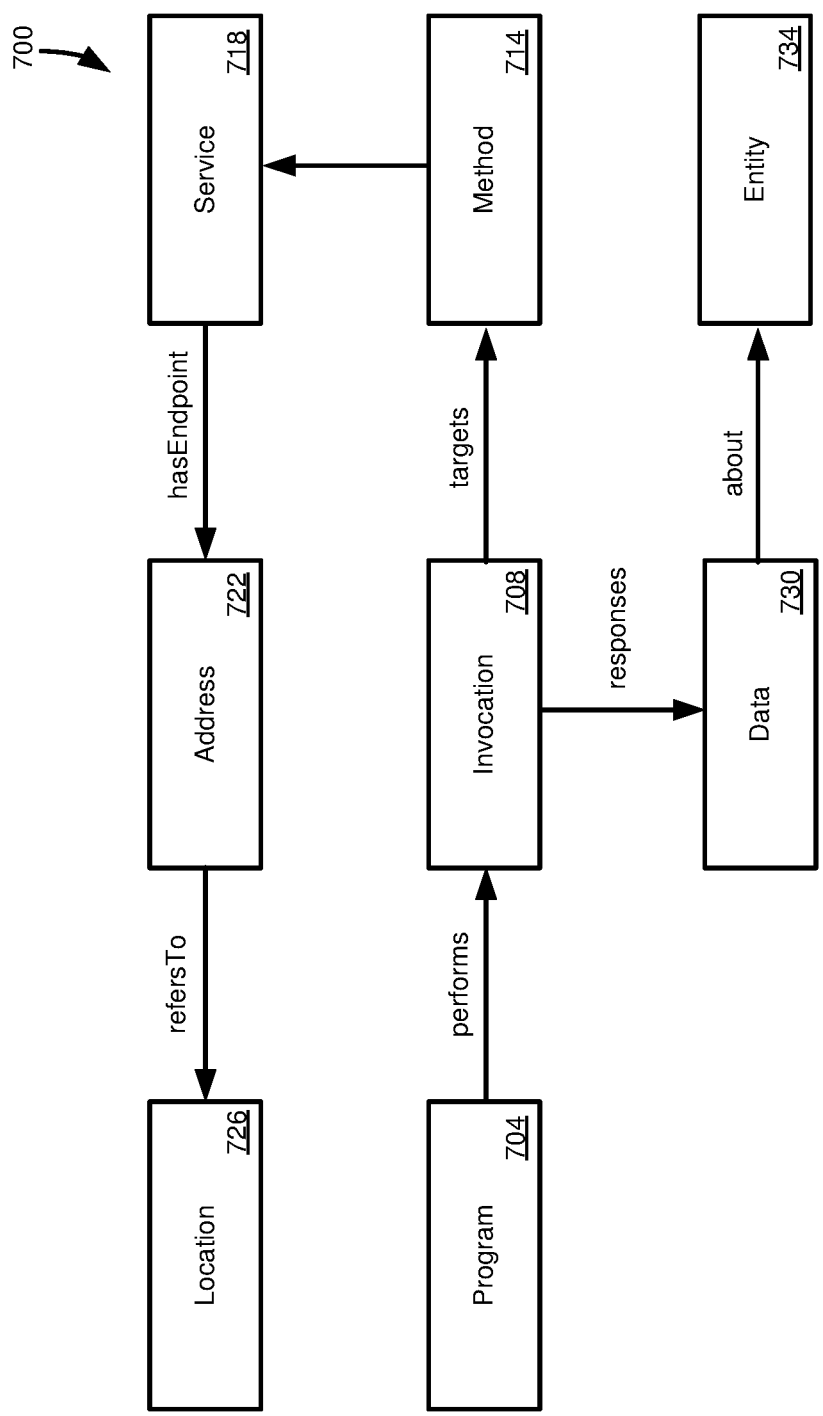
FIG. 7 is a diagram illustrating the interrelation of program information elements.

FIG. 7 illustrates a specialization of the ontology introduced in Example 4. It introduces formalized submitted matter terms associated with the invocation of processes (e.g., methods) by a program 704, and how these elements may be used to help determine the presence of a potential compliance issue. The program 704 performs invocations 708 that target particular methods 714 of a service 718. The service 718 can be, for example, an external or remote service, such as a web service. The service 718 can include information about where the service is located (an endpoint), such as an address 722 of the location 726. The address 722 can be specified, for example, in a descriptor file.

As an example, remote procedure calls, SOAP operations, and REST operations can use XML descriptor files that can include information regarding the location of the service 718, data sent to and received from the service (such as data 730), and operations carried out by the service. This information can be used to generate additional instances of formalized subject matter, which in turn can be subsumed under one or more formalized compliance terms. In some cases, this information can be automatically extracted and analyzed (e.g., using an appropriate component of the compliance engine 110). In other cases, all or a portion of the information can be supplied by a user. As described above for the views of FIGS. 4 and 5, a user can be allowed, or prompted, to supply information needed to complete a compliance determination.

Information associated with the invocations 708 (e.g. arguments sent to the methods 714), data 730 received in response to the invocations, or information regarding the services 718 (such as parameters required by, processes carried out at, or the address 722 of the service) can be further analyzed, in an automated manner using a component of the compliance engine 110, manually by a user, or a combination thereof. Data 730 can be analyzed to determine what entity 734 the data refers to or describes. In some cases, the entity 734 (or particular sources of data 730) can be associated with a library of entities or data sources that are known to give rise to, or not to give rise to, potential compliance issues. Similarly, addresses 722 or locations 726 can be included in a library of addresses or locations known to give rise to, or not to give rise to, potential compliance issues.

The elements of the ontology 700 can be subsumed under one or more formalized compliance terms, which in turn can be used to determine, or help determine, compliance with a particular formalized norm, either automatically, by a user, or a combination thereof.

Example 8—Example Software Architecture

Figure 8:
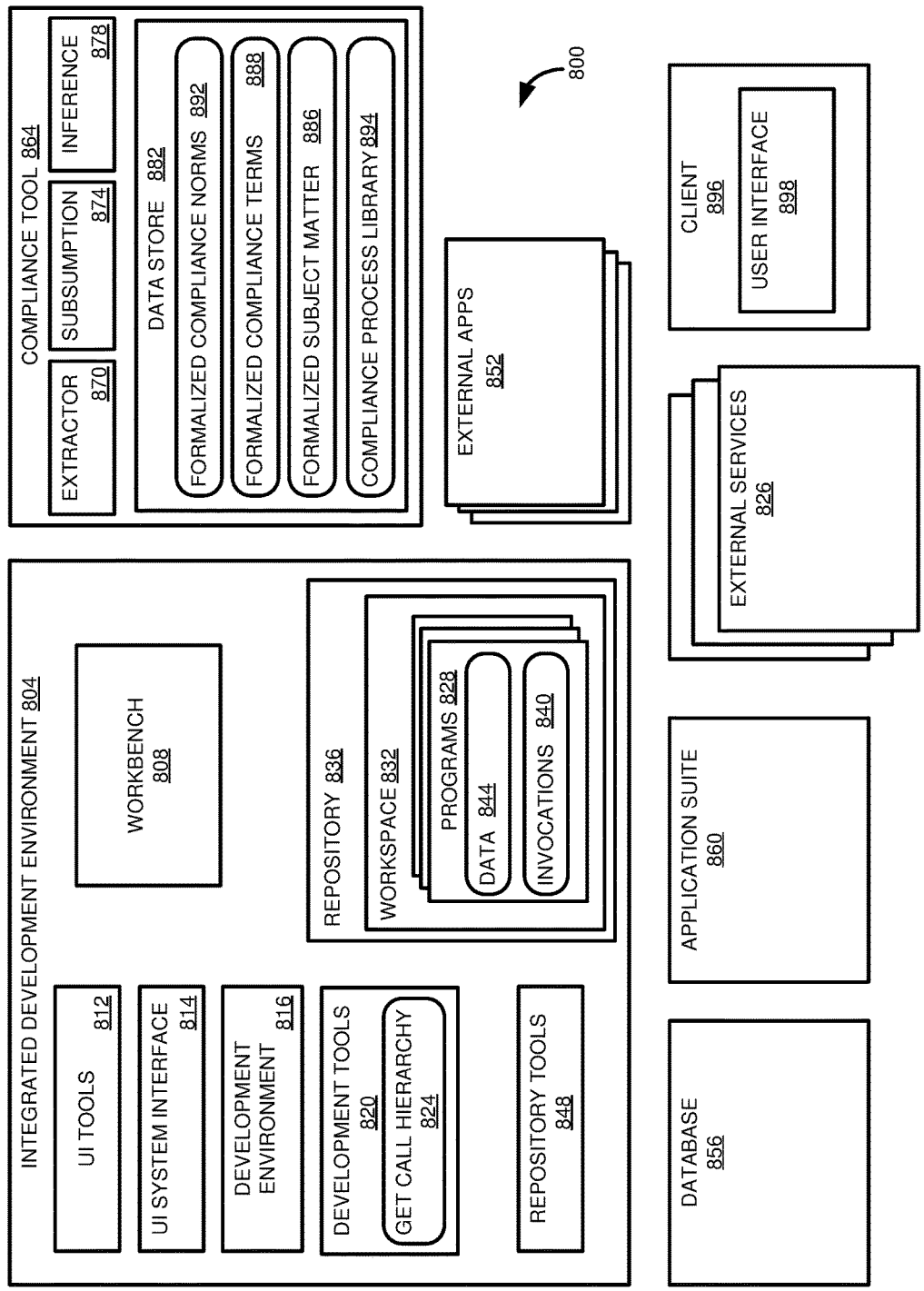
FIG. 8 is a block diagram illustrating an example software architecture in which a compliance tool can use an integrated development environment to determine processes invoked by a program to facilitate the determination of whether invoked processes may result in a potential compliance issue.

Example 6 generally described how program information of a general application 600 (which in turn can be represented as instances of formalized subject matter) can relate to a formalized compliance norm (including its component formalized compliance terms) to determine potential compliance issues. FIG. 8 illustrates an example software architecture 800 in which one or more of the disclosed innovations may be implemented. The architecture 800 can include an integrated development environment 804.

The integrated development environment 804 can facilitate the creation, maintenance, and use of a program. As will be further described, the integrated development environment 804 can facilitate a determination of what processes are invoked by a program, as well as providing details of the invoked processes, such as the location of the process, operations carried out by the process, and data received from and provided to, the process. In a particular example, the integrated development environment 804 can be the ECLIPSE development environment (Eclipse Foundation, Inc., Ottawa, Canada).

It should be appreciated that the present disclosure does not require the use of an integrated development environment 804, or any of the components included therein. In some cases, components of the integrated development environment 804, or components providing analogous functionality, can be organized and accessed in another manner. For example, processes invoked by a program can be extracted from source code by a program written to include such functionality, including from comments to the program (e.g., using a documentation generation program, such as DOXYGEN).

The integrated development environment 804 can include a workbench 808. The workbench 808 can be used to create and modify programs. The integrated development environment 804 can provide user interface tools 812 to facilitate the creation of a graphical user interface for a program and user interface elements. The user interface tools 812 can include the JFACE user interface toolkit (Eclipse Foundation, Inc., Ottawa, Canada). In some cases, the user interface tools 812 can communicate with addition UI components, such as a UI system interface component 814. In a particular example, the UI system interface component 814 can be the Simple Widget Toolkit (Eclipse Foundation, Inc., Ottawa, Canada). SWT can provide widgets and other functionality to interface with a native operating system. JFACE can interface with SWT to simplify programming tasks and to provide a model-based structure for SWT components (including, in some cases, adding logic to SWT elements).

The integrated development environment 804 can provide a development environment component 816 (such as a plugin, such as the plugin development environment (PDE) of Eclipse Foundation, Inc., Ottawa, Canada). The development environment 816 can include tools and scripts to facilitate program development, user interface models, builders and editors, and application program interface (API) tools (such as to test API compatibility). Program development tools 820 can be included in the integrated development environment 804 to further facilitate programming tasks and program creation. For instance, the program development tools 820 can include editors, compilers, hierarchy computation, code refactoring, and graphical user interfaces to assist in visualizing and editing a program. In a particular example, the program developments tools 820 can include the JAVA® Development Tooling (JDT) of the Eclipse Foundation, Inc., Ottawa, Canada.

Among the functionality provided be the program development tools 820 (or other component of the integrated development environment 804) is functionality 824 to get the call hierarchy of a program. That is, the get call hierarchy functionality 824 can provide a list of processes, such as internal methods or external methods (such as methods or processes carried out using external services 826, including remote procedure calls and web service invocations) invoked by the program. This invocation information can be used to determine whether any potential compliance issues are raised by the program.

One or more programs 828 can be organized in a workspace 832, and the workspace stored in a repository 836. The programs 828 can include components described in FIG. 6, including process invocations 840 and data 844 (which can include the actual data used by the program, as well as the identifiers of particular data sources). The integrated development environment 804 can include repository tools 848, such as for organizing, searching, and accessing the repository 836.

The integrated development environment 804 can provide a framework for integrating other development tools, which may be stored in the repository 836 or can be external applications (such as plugins) 852. The external applications 852 can include adapters that allow the workbench 808 to use other programming languages. For example, the ECLIPSE IDE by default supports the JAVA® programming language, but can be adapted to use other programming languages, such as C++, using a suitable plugin 852 (or program 828). Plugins 852 can also be used to help create programs that can run in particular operating environments (such as particular operating systems, computing environments (for example, database systems), and application frameworks). As a particular example, SAP SE of Walldorf, Germany, provides a set of ECLIPSE plugins 852 that implement HANA® STUDIO, an integrated development environment to create HANA® XS or HANA® XS2 applications, including applications that can interact with the HANA® database system (e.g., a database 856) or the S/4 HANA® or S/4 CLOUD PLATFORM frameworks (e.g., an application suite 860).

A compliance tool 864 can interface with the integrated development environment 804, such as operating as a plugin (which can be an internal or external plugin). The compliance tool 864 can operate the compliance engine 100 of FIG. 1. For example, the compliance tool 864 can provide an extractor component 870 (operating the extraction engine 115), a subsumption component 874 (operating the subsumption engine 120), and an inference component 878 (operating the inference engine 125).

In the particular example of FIG. 8, including where a program is to be analyzed for potential compliance issues, the extractor component 870 can retrieve information associated with the program, such as processes invoked by the program (including data sources associated with the processes, data associated with the processes, operations carried out by the processes, and locations associated with the processes) and data and data sources used by the program. In some aspects, the extractor component 870 can analyze the code of the application (or can cause the program code to be analyzed) to extract program information (including process invocations, data, and data sources). In particular examples, the program information can be mapped as instances of formalized subject matter, such as using a schema or ontology.

In a particular case, the extractor component 870 can determine processes invoked by a program by accessing the development tools 820, such as by accessing the get call hierarchy function 824. Or, the extractor component 870 can otherwise include code to determine the call hierarchy, such as to retrieve hierarchy information using another element of the development tools 820 (for example, creating a call hierarchy object, the call hierarchy object storing process objects (e.g., methods) of the program, the process object storing invocation information associated with the program processes).

The extractor component 870 can extract information regarding any invoked processes. For instance, the extraction component 870 can determine arguments sent to (or parameters of) invoked processes. In some cases, the arguments and parameters can represent data sent to, or received from, an invoked process, or information regarding a location of an invoked process. The arguments and parameters, as well as the invoked processes themselves, can be represented as instances of particular elements of a formalized subject matter schema (e.g., an ontology), and subsumed under one or more formalized compliance terms.

The information regarding process invocations of a program (and other formalized subject matter or program information) can be stored in a data store 882 of the compliance tool 864. For example, the information regarding process invocations (and other program information) can be stored as instances of formalized subject matter 886. The instances of formalized subject matter 886 associated with a program can then be processed by the subsumption component 874. Process invocations (and other program information) can be analyzed to determine whether they can be subsumed under any formalized compliance terms 888 stored in the data store 882 and accessible by the subsumption component 874.

At least certain process invocations or other instances of formalized subject matter (including process invocation parameters or arguments) 886 can be subsumed under one or more of the formalized compliance terms 888 directly, or indirectly using a schema or ontology. Subsuming the instances of formalized subject matter 886 under formalized compliance terms using the subsumption component 874 can help ensure that terminology differences in the sources of formalized subject matter (e.g., configuration information in a XML file) are harmonized in conducting a compliance analysis (e.g., harmonized to a common schema/ontology, which is then subsumed under formalized compliance terms).

Information regarding instances of the formalized subject matter 886, such as a name of an invoked process (or particular parameters or arguments) and, in some cases, an identifier (e.g., a particular URL or IP or other network address associated with the data) can be attached to an ontology or schema element as part of the operation of the extractor component 870. The collection of formalized subject matter elements (such arguments, parameters, and addresses) of which a program can have instances (particular arguments, parameters, and addresses associated with an invoked method) can be referred to as program information. In turn, the program information can be attached to any formalized compliance terms under which the instances are subsumed by the subsumption component 874.

After the data sources or other formalized subject matter 886 have been processed by the subsumption component 874, the subsumption results 888 can be analyzed by the inference component 878. For example, the inference component 878 can apply one or more compliance rules related to formalized compliance norms 892 of the data store 882 (e.g., relationships between formalized compliance terms) to the subsumption results to determine whether a compliance issue may exist.

According to a particular aspect, the inference component 878 (or, in some implementations, the subsumption component 874) can determine whether a process invocation is of a process in a process compliance library 894. The process compliance library 894 can include processes that are known to potentially give rise to (or, in an alternative implementation, known not to give rise to) a potential compliance issue. The compliance tool 864 can provide information regarding any potential compliance issues to a user (e.g., using a user interface 898 of a client computing system or device 896), such as using the example displays of FIG. 4 or 5. The process compliance library 894, or another library of the data store 882, can also include compliance information regarding other types of program information, including data sources of a program.

The architecture 800 can include more or fewer components than shown, and may be organized in other manners. For example, functionality of a particular component can be carried out by another component. In addition, in at least some cases, functionality can be carried out using multiple components. In a specific example, all or a portion of the functionality of two or more of the user interface tools 812, the user interface system interface 814, the development environment 816, or the repository tools 848 may be combined, or the functionality of the database 856 and the application suite 860 combined.

As an example of how the architecture 800, and the ontology 700 of FIG. 7, can be used in a compliance determination, the following pseudocode (which, in particular, can be implemented in the JAVA® programming language, including being a class provided by a development tool, such as JDT) illustrates how a call hierarchy can be determined using ECLIPSE as the integrated development environment:

```
CallHierarchy callHierarchy = CallHierarchy.getDefault( ); //create CallHierarchy object
For each method m in process compliance library 894,
    Method[ ] invocations = callHierarchy.GetCallers(m);//Determine if library method invoked
    If invocations == null;
        Continue;//go to next method in library
    Else
        For each invocation i in invocations
            ProcessInvocations(m, i);//perform compliance analysis for invocations of library methods
        End for;
End for;
```

The compliance analysis can be carried out using a ProcessInvocation method, an pseudocode implementation of which can be:

```
ProcessInvocation (Method m, Invocation i)
    Make m an instance of the ontology class "Method"
    Make i an instance of the ontology class "Invocation"
    Establish an ontological relation "targets" between i and m
    For each parameter p in i.parameters;//or arguments a in i.arguments
        Make p an instance of the ontology class "Data"
        Establish an ontological relation "responses" between i and p;
        Get ArgumentType of m and make it an instance s of "Service"
        Establish ontological relation between m and s
        If s has an address (e.g., IP or other network address or host name)
            Make address an instance of "Address" and relate is to s
```

The formalized subject matter instances (invoked methods and associated information), represented in the ontology, can then be subsumed under one or more formalized compliance terms. The formalized compliance terms can then be analyzed using one or more formalized compliance norms to determine if any potential compliance issues may exist.

Example 9—Example Compliance Analysis Using Call Hierarchy

Figure 9:
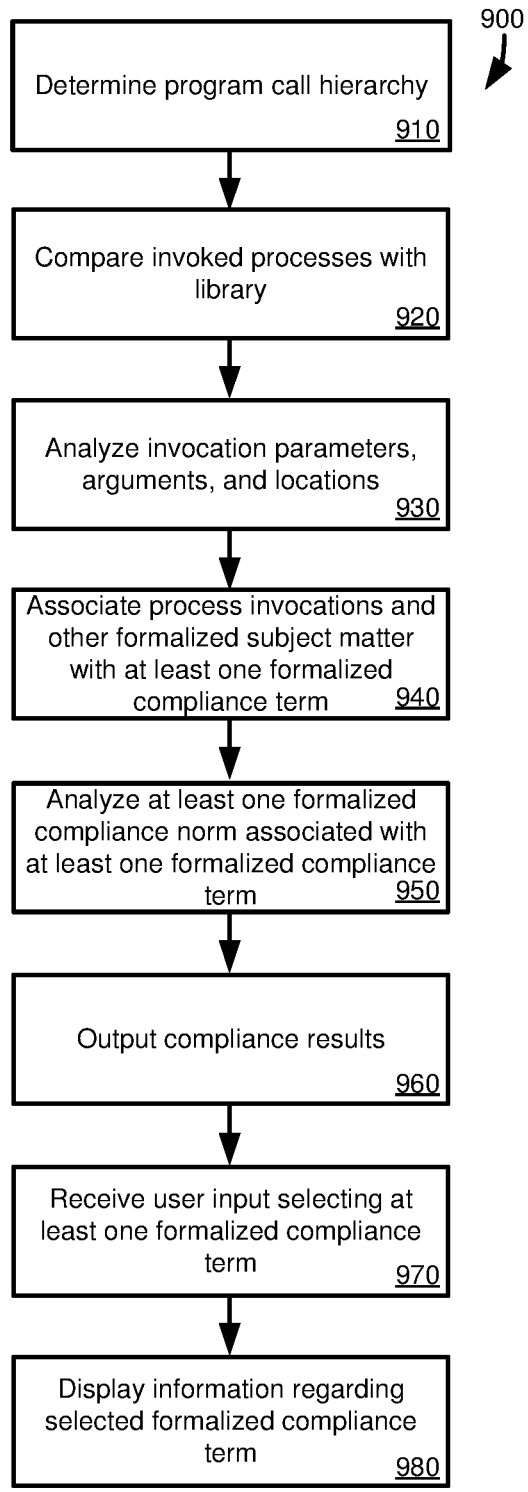
FIG. 9 is a flowchart of a method for presenting to a user compliance information obtained by analyzing processes invoked by a program.

FIG. 9 illustrates a flowchart of an example method 900 for carrying out a compliance analysis by analyzing a program call hierarchy to determine processes invoked by the program, and analyzing information associated with the invoked processes, such as using the integrated development environment 804 of the architecture 800 of FIG. 8. At 910, a program call hierarchy is determined, such by using the development tools 820 of the integrated development environment 804. The invoked processes are compared with a library, such as a library of processes known to potentially give rise to, or not to give rise to, a potential compliance issue, at 920. The comparing provides at least one process to be further analyzed for potential compliance issues.

At 930, information regarding the at least one process is further analyzed. For example, parameters, arguments, and addresses are determined. The at least one process invocation, and additional information determined at 930, is subsumed under at least one formalized compliance term at 940. In some cases, the at least one process invocation and additional program information can be associated with a formalized subject matter element, and the formalized subject matter element subsumed under a formalized compliance term. In other cases, the at least one process invocation and additional program information can be directly subsumed under a formalized compliance term of a formalized compliance norm. In yet further cases, the at least one invoked process and additional program information can be directly associated with a formalized compliance norm.

At 950, at least one formalized compliance norm is analyzed, the formalized compliance norm being associated with the at least one formalized compliance term associated with the at least one invoked process or other program information at 940. In a particular example, analyzing the formalized compliance norm includes determining whether not a particular process, or a particular type of process, is invoked. Compliance results, such as whether a potential compliance issue may exist, are output at 960.

At 970, user input is received. The user input selects at least one formalized compliance term associated with the compliance results. In response to the user input, at 980, information is displayed to the user regarding the selected formalized compliance term. The information may include process invocations associated with the formalized compliance term, text of a formalized compliance norm associated with the formalized compliance term, analyses of a formalized compliance norm associated with the formalized compliance term, whether the selected formalized compliance term is associated with a potential compliance issue, possible remedial action to address any potential compliance issues associated with the selected formalized compliance term, or combinations thereof.

Example 10—Computing Systems

Figure 10:
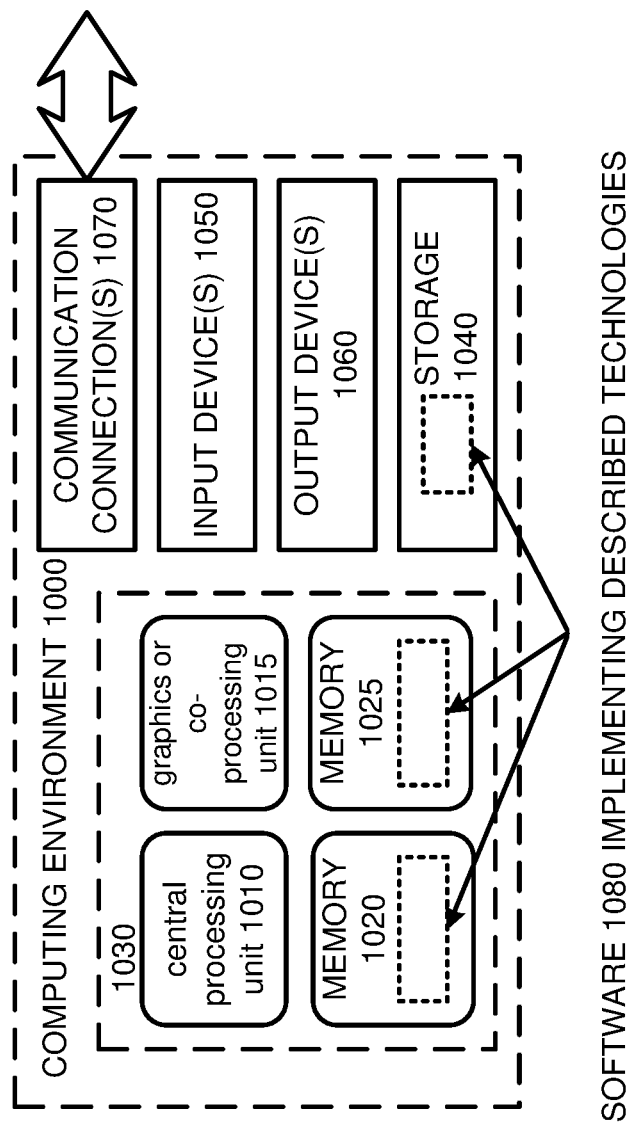
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of the framework 100 of FIG. 1 or the architecture 800 of FIG. 8, including the extractor component 870, the subsumption component 874, and the inference component 878. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015. The memory 1020, 1025, may also store database data, such as data associated with the database 856 of FIG. 8.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 11:
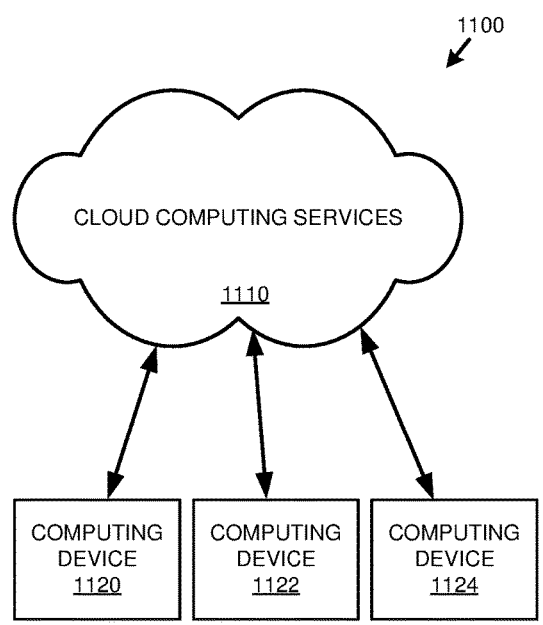
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, JAVA®, Perl, JAVASCRIPT®, PYTHON™, Ruby, ABAP®, SQL, ADOBE® FLASH®, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more non-transitory computer-readable storage media storing computer-executable instructions for causing a computing system to perform processing to analyze whether a software program may create a compliance issue, the processing comprising:

automatically determining, with a compliance tool specified by the computer-executable instructions, identifiers for each of a plurality of processes invoked by a software program by analyzing source code for the software program;

comparing the identifiers of the plurality of invoked processes with a process compliance library, the process compliance library comprising an identifier of at least one process;

determining that an invoked process results in a potential compliance violation;

from the source code, determining at least one data source accessed by the invoked process resulting in a potential compliance violation;

comparing the at least one data source with a data source compliance library, the data source compliance library comprising an identifier of the at least one data source;

from the source code, determining at least one location to which data from the at least one data source may be transmitted as a result of invoking the process resulting in a potential compliance violation;

determining that the at least one data source is associated with a compliance warning; and outputting to a user a display of compliance results, the compliance results comprising a process of the plurality of processes, the process associated with the compliance warning, the display indicating the at least one data source accessed by the invoked process resulting in a potential compliance violation and the at least one location to which data from the at least one data source may be transmitted as a result of invoking the process resulting in a potential compliance violation.

2. The one or more non-transitory computer-readable storage media of claim 1, wherein the compliance results comprise a compliance warning for any processes of the plurality of processes matching a process of the compliance library.

3. The one or more non-transitory computer-readable storage media of claim 1, wherein the compliance results comprise a compliance warning for any processes of the plurality of processes that do not match a process of the compliance library.

4. The one or more non-transitory computer-readable storage media of claim 1, wherein automatically determining a plurality of processes invoked by the program comprises calling a method to generate a call hierarchy of the program.

5. The one or more non-transitory computer-readable storage media of claim 4, wherein the method is a method of an integrated development environment.

6. The one or more non-transitory computer-readable storage media of claim 5, wherein the compliance tool is a plugin to the integrated development environment.

7. The one or more non-transitory computer-readable storage media of claim 1, wherein the compliance results comprise at least one process of the plurality of processes associated with a compliance warning, the processing further comprising:

determining an external resource associated with the at least one process of the compliance results; and wherein the compliance results provide an indication of a potential compliance issue associated with the external resource.

8. The one or more non-transitory computer-readable storage media of claim 7, the processing further comprising:

comparing the plurality of processes with an external resource process compliance library, the external resource process compliance library comprising an identifier of at least one external resource.

9. The one or more non-transitory computer-readable storage media of claim 7, the processing further comprising:
analyzing data transmitted to, or received from, the external resource.

10. The one or more non-transitory computer-readable storage media of claim 9, wherein analyzing data transmitted to, or received from, the external resource comprises analyzing descriptor information associated with the at least one process.

11. The one or more non-transitory computer-readable storage media of claim 1, wherein automatically determining a plurality of processes invoked by the program comprises analyzing program documentation.

12. The one or more non-transitory computer-readable storage media of claim 1, the processing further comprising:
automatically associating at least a portion of the plurality of processes invoked by the program with one or more formalized compliance terms using the compliance tool.

13. The one or more non-transitory computer-readable storage media of claim 12, wherein determining compliance results comprises analyzing at least a portion of the plurality of processes invoked by the program using at least one formalized compliance norm comprising at least one of the one or more formalized compliance terms.

14. The one or more non-transitory computer-readable storage media of claim 1, wherein outputting to the user the compliance results comprises displaying to the user a representation of formalized compliance terms associated with a formalized compliance norm, wherein formalized compliance terms potentially associated with a compliance issue are visually indicated to a user.

15. The one or more non-transitory computer-readable storage media of claim 14, the processing further comprising:
receiving user input selecting a displayed formalized compliance term; and
providing the user with text of the formalized compliance norm associated with the formalized compliance term.

16. The one or more non-transitory computer-readable storage media of claim 14, wherein the formalized compliance terms each comprising a status, the processing further comprising:
receiving user input altering the status of at least one formalized compliance term.

17. The one or more non-transitory computer-readable storage media of claim 16, further comprising updating a status of the formalized compliance norm based on the user input.

18. A computing system that implements a compliance tool, the computing system comprising:
one or more memories;
one or more processing units coupled to the one or more memories; and
one or more non-transitory computer readable storage media storing instructions that, when loaded into the memories, cause the one or more processing units to perform operations for:
automatically determining a call hierarchy for a program by analyzing source code for the program, the call hierarchy comprising a plurality of processes invoked by the program;
determining from the source code program information associated with at least one of the plurality of invoked processes, the program information comprising an identifier of the at least one of the plurality of invoked processes, at least one data source accessed by the at least one of the plurality of invoked processes, and
at least one location to which data associated with the at least one data source is transmitted by the at least one of the plurality of invoked processes;
associating at least a portion of the program information with at least one formalized compliance term, the associating comprising:
comparing the identifier with a library comprising a plurality of process identifiers;
comparing the at least one data source with a data source compliance library, the data source compliance library comprising an identifier of the at least one data source;
determining that the at least one data source is associated with a compliance warning; and
determining based on at least one of the comparing the identifier and the comparing the at least one data source that the at least one of the plurality of invoked process results in a potential compliance violation;
analyzing the at least one of the invoked processes using at least one formalized compliance norm comprising the at least one formalized compliance term; and
outputting for display a visual representation of the formalized compliance norm and associated formalized compliance term, the visual representation comprising an indicator of the identifier, an identifier of the at least one of the plurality of invoked processes, the at least one data source, and the at least one location.

19. In a computing system comprising a memory and one or more processors, a method of evaluating a potential compliance issue associated with at least one formalized compliance norm, the method comprising:
automatically determining a plurality of processes invoked by a program by analyzing source code for the program;
automatically determining at least one of arguments, parameters, and addresses associated with at least one of the plurality of invoked processes by analyzing the source code;
determining from the source code at least one data source accessed by the at least one of the plurality of invoked processes;
comparing the at least one data source with a data source compliance library, the data source compliance library comprising an identifier of the at least one data source;
determining that the at least one data source is associated with a compliance warning;
associating at least one argument, parameter, or address of the at least one of the plurality of invoked processes with a potential compliance issue to provide compliance results; and
outputting for display a visual representation of the compliance results, the visual representation comprising an identifier of the at least one argument, parameter, or address and an identifier of the at least one of the plurality of invoked processes.

* * * * *